United States Patent [19]
Poncini

[11] Patent Number: 5,168,963
[45] Date of Patent: Dec. 8, 1992

[54] DOUBLE CALIPER BRAKING SYSTEM WITH DIFFERENTIAL BRAKING ACTION

[75] Inventor: Gianfranco Poncini, Turin, Italy

[73] Assignee: Fiat Auto S.p.A., Turin, Italy

[21] Appl. No.: 693,644

[22] Filed: Apr. 30, 1991

[30] Foreign Application Priority Data

Apr. 30, 1990 [IT] Italy .................. 20172 A/90

[51] Int. Cl.⁵ .................. B60S 1/62; F16D 55/26; B60T 11/00
[52] U.S. Cl. .................. 188/72.5; 188/72.6; 188/106 P; 188/344; 188/73.2; 303/9
[58] Field of Search ............. 188/71.1, 85, 105, 106 P, 188/370, 152, 72.2, 151 A, 344, 71.3, 72.5, 72.6, 73.2, 73.31; 303/9

[56] References Cited

U.S. PATENT DOCUMENTS

| | | | |
|---|---|---|---|
| 4,040,506 | 9/1977 | Newstead | 188/106 P X |
| 4,793,663 | 12/1988 | Ocvirk et al. | 303/116 R X |
| 4,865,164 | 9/1989 | Kaneda | 188/344 X |
| 5,024,298 | 6/1991 | Schenk et al. | 188/72.5 X |

FOREIGN PATENT DOCUMENTS

| | | | |
|---|---|---|---|
| 2656247 | 6/1978 | Fed. Rep. of Germany . | |
| 0237281 | 9/1989 | Japan | 188/344 |
| 0068287 | 3/1990 | Japan | 188/344 |
| 1164717 | 9/1969 | United Kingdom | 188/72.5 |
| 1245523 | 9/1971 | United Kingdom . | |
| 2109068 | 5/1983 | United Kingdom . | |

Primary Examiner—Robert J. Oberleitner
Assistant Examiner—Josie A. Ballato
Attorney, Agent, or Firm—Longacre & White

[57] ABSTRACT

A double caliper braking system of differential action, operated by a pressure circuit with two parallel branches connected to the calipers. One of the brake calipers is of smaller dimensions than the other. One of the two branches is provided with a pressure regulator device to cause only one of the two calipers present in the system to act up to a certain threshold value.

8 Claims, 1 Drawing Sheet

DOUBLE CALIPER BRAKING SYSTEM WITH DIFFERENTIAL BRAKING ACTION

This invention relates to a double caliper braking system, and more particularly to a braking system in which the calipers have differential action.

The problem of reducing the sometimes annoying noise of braking systems is well known.

The noise which arises during weak deceleration braking creates problems, particularly from the servicing aspect, in that it can lead to false estimation of the state of wear of the friction linings.

This noise is substantially due to the intrinsic vibration frequencies of one or more parts of the braking system. Attempts to attenuate or eliminate it are generally made by increasing the intrinsic damping of the materials with which the system components are constructed. It should also be noted that the noise tends to manifest itself more easily the larger the discs and pads.

An object of the present invention is to solve the braking noise problem by providing a double caliper braking system with differential action.

A further object is to optimize the braking system action for two very different working conditions, namely light braking for slow deceleration and sudden braking for rapid deceleration, without having to modify the friction materials.

These objects are attained by a double caliper braking system consisting essentially of a disc supported by a hub and rotatable within a pair of brake calipers connected to a pressure circuit and fixed to said hub, characterized in that one of said brake calipers is of smaller dimensions than the other, said one of said calipers acting under a pressure in said circuit which is less than the pressure under which said other of said calipers acts. Preferably the pressure under which said one of said calipers acts is between zero and 25 bars.

In addition said pressure circuit consists of two parallel branches each of which is connected to one of said calipers. Again according to the present invention, in that branch of said circuit which is connected to said caliper of larger dimensions there is provided a pressure subtraction device arranged to cause said caliper of smaller dimensions to act within a predetermined pressure range.

In one embodiment of the invention said pressure subtraction device is a counteracting spring device. Preferably said calipers are arranged in diametrically opposite positions about said disc.

The technical characteristics and further advantages will be more apparent from the following description given by way of non-limiting example with reference to the single accompanying drawing in which.

Figure 1:
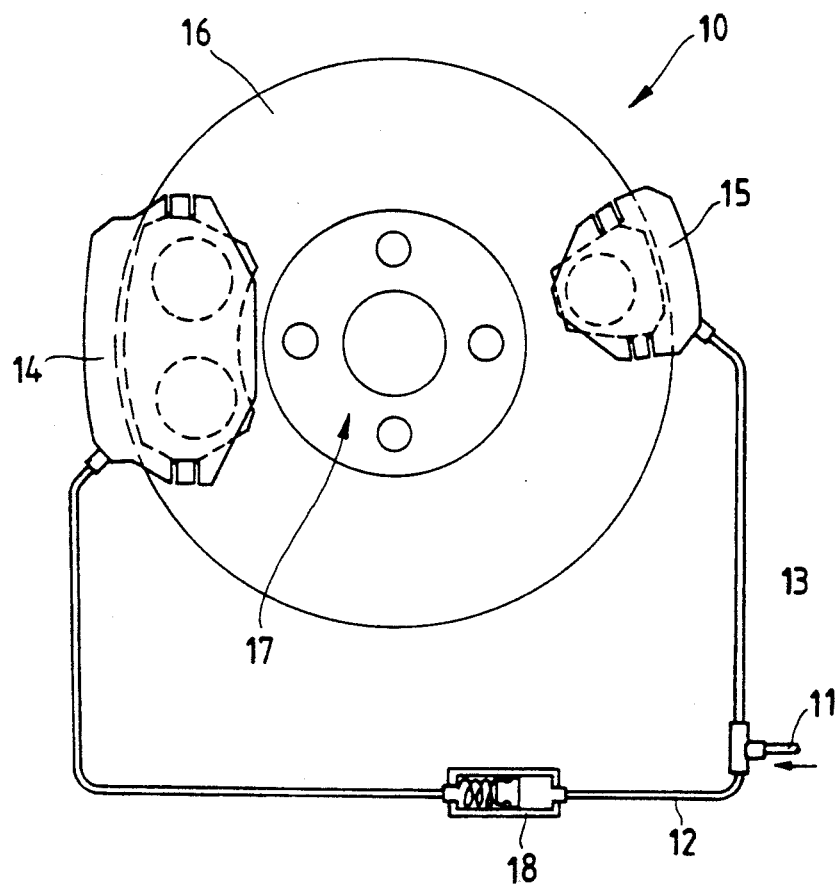
FIG. 1 is a schematic view of a braking system according to the invention.

In the figures the reference numeral 10 indicates overall a system according to the invention, showing a pressure circuit 11 connected by two branches 12 and 13 to a pair of brake calipers 14 and 15.

A braking rim 16 of a disc 17 rotatable on a hub or the like (not shown) is located within the brake calipers 14 and 15.

The calipers 14 and 15 are arranged in substantially diametrically opposite positions about the disc 17. In the branch 12 of the pressure circuit 11 there is provided a pressure subtraction device 18, which by way of example is of the counteracting spring type.

Figure 2:
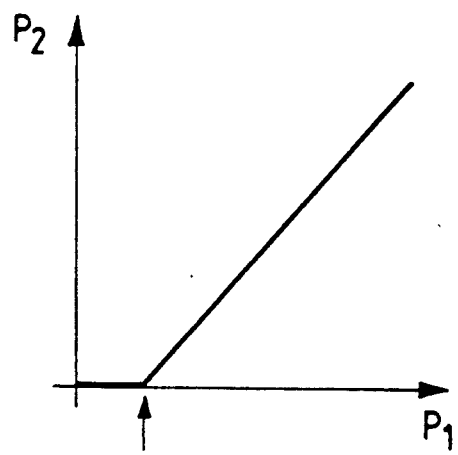
FIG. 2 is a diagram showing the pressure variations in the system.

The graph of FIG. 2 shows the variation in the pressures of the circuit branches 12 and 13 for a spring preloading which can vary typically between zero and 25 bars. The pressure applied to caliper 15 is represented on the horizontal axis P1, while the pressure applied to caliper 14 is represented on the vertical axis P2. When the brake pedal is operated for slow deceleration, and the circuit pressure does not exceed the value set for the spring of the device 18, only the caliper 15 is operated, by the circuit branch 13. As the caliper 15 including all its components (pads included) is smaller than the disc 17 or the other caliper 14, noise due to intrinsic vibration frequencies is no longer manifested.

On acting forcibly on the brake pedal, and thus for sudden braking, the pressure in the circuit 11 exceeds that of the device 18 to also allow the caliper 14 to operate.

This advantageously optimizes the braking system for two very different working conditions without compromising the friction material, thus making powerful braking and low wear coupled with noiselessness simultaneously possible.

I claim:

1. A double caliper braking system consisting essentially of a disc supported by a hub and rotatable within first and second brake calipers connected to a pressure circuit and fixed to said hub, characterized in that said first brake caliper is of smaller dimensions than said second caliper, said first caliper acting under a pressure in said circuit which is less than the pressure under which said second caliper acts whereby a pressure subtraction device is adapted to cause said first caliper to act within a predetermined pressure range, said pressure circuit consists of two branches each of which is connected to one of said calipers, said branches being connected in parallel.

2. A system as claimed in claim 1, characterized in that said pressure subtraction device is provided in said branch of said circuit which is connected to said second caliper.

3. A system as claimed in claim 2, characterized in that said pressure subtraction device is a counteracting spring device.

4. A double caliper braking system comprising:
   a first brake caliper;
   a second brake caliper having larger dimensions than said first brake caliper and acting under a pressure which is greater than the pressure under which the first caliper acts;
   a disc supported by a hub and rotatable within said first and second calipers;
   a pressure circuit having a supply branch dividing into first and second parallel branches, said first parallel branch supplying pressure to said first caliper, said second parallel branch supplying said second caliper;
   a pressure subtraction device adapted to cause said first caliper to act within a predetermined pressure range; whereby
   when the pressure supplied to said first caliper exceeds said predetermined range, said second caliper is activated.

5. A system as recited in claim 4, wherein said pressure subtraction device is provided in said second branch.

6. A system as recited in claim 4, whereby said predetermined pressure range is between zero and 25 bars.

7. A system as recited in claim 4, whereby said pressure subtraction device is a counteracting spring device.

8. A system as recited in claim 4, whereby said first and second calipers are arranged substantially in diametrically opposite positions about said disk.

* * * * *